US010296778B2

(12) United States Patent
Cuti et al.

(10) Patent No.: US 10,296,778 B2
(45) Date of Patent: May 21, 2019

(54) METHODS, DEVICES, AND COMPUTER-READABLE MEDIA FOR BIOMETRIC COLLECTION, QUALITY CHECKING, AND MATCHING

(71) Applicant: Northrop Grumman Systems Corporation, Falls Church, VA (US)

(72) Inventors: Richard A. Cuti, Bedford, MA (US); Michael Kacos, Londonderry, NH (US); David W. Hammond, Atkinson, NH (US); Gustavo D. Silva, Dracut, MA (US); Gabriel D. Hoffman, Falls Church, VA (US); Nicholas E. Papanickolas, Peabody, MA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 36 days.

(21) Appl. No.: 14/706,594

(22) Filed: May 7, 2015

(65) Prior Publication Data
US 2016/0217313 A1  Jul. 28, 2016

Related U.S. Application Data

(60) Provisional application No. 61/990,384, filed on May 8, 2014.

(51) Int. Cl.
*G06K 9/00* (2006.01)
*G06F 17/30* (2006.01)
(Continued)

(52) U.S. Cl.
CPC ....... *G06K 9/00087* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 7,698,322 B1 * 4/2010 Langley ................. G06Q 50/26
340/5.53
2003/0215114 A1 * 11/2003 Kyle ....................... G06F 21/32
382/115
(Continued)

FOREIGN PATENT DOCUMENTS

WO   03/007125 A2   1/2003
WO   2009/075978 A1  6/2009

OTHER PUBLICATIONS

International Search Report and Written Opinion issued in International Application PCT/US2015/029766 dated Jul. 14, 2015.
(Continued)

*Primary Examiner* — Chan S Park
*Assistant Examiner* — Elisa M Rice
(74) *Attorney, Agent, or Firm* — Katten Muchin Rosenman LLP

(57) ABSTRACT

A user interface device and method for biometric information processing in a user interface device for biometric collection, quality checking, and matching are disclosed. Embodiments provide a user interface device for capturing biometric information (such as fingerprints) of a subject, determining the quality of the captured biometric information, and comparing the captured biometric information to stored biometric information for possible matches. Comparisons using high quality captured biometric information result in quicker and more accurate verification of identities.

35 Claims, 13 Drawing Sheets

(51) Int. Cl.
*G06F 3/0482* (2013.01)
*G06F 3/0484* (2013.01)
*G06F 3/0488* (2013.01)

(52) U.S. Cl.
CPC .... *G06F 3/04842* (2013.01); *G06F 17/30256* (2013.01); *G06K 9/00013* (2013.01); *G06K 9/00926* (2013.01); *G06K 9/00006* (2013.01); *G06K 2009/00946* (2013.01)

(56) References Cited

U.S. PATENT DOCUMENTS

| | | | |
|---|---|---|---|
| 2004/0005087 A1* | 1/2004 | Hillhouse | G06F 21/32 382/125 |
| 2005/0273865 A1* | 12/2005 | Slijp | H04N 1/4433 726/28 |
| 2006/0013446 A1* | 1/2006 | Stephens | G07C 9/00158 382/115 |
| 2007/0036400 A1 | 2/2007 | Watanabe et al. | |
| 2012/0039537 A1* | 2/2012 | Keys | H04N 1/00183 382/182 |
| 2012/0148115 A1 | 6/2012 | Birdwell et al. | |
| 2013/0215275 A1 | 8/2013 | Berini et al. | |
| 2013/0259330 A1 | 10/2013 | Russo et al. | |
| 2013/0336545 A1* | 12/2013 | Pritikin | G06K 9/00892 382/116 |

OTHER PUBLICATIONS

"NIST Biometric Image Software", Current Release: NBIS : Relese 5.0.0., http://www.nist.gov/itl/iad/ig/nbis.cfm, Date created: May 14, 2010 | Last updated: Mar. 4, 2015, as downloaded Jul. 28, 2015.
"NIST Biometric Open Source Server", http://www.nist.gov/itl/iad/ig/nigos.cfm, Date created: May 14, 2010 | Last updated: Mar. 4, 2015, as downloaded Jul. 28, 2015.
Watson, Craig I., et al., "User's Guide to NIST Biometric Image Software (NBIS)", National Institute of Standards and Technology, Gaithersburg, MD, pp. 1-207, Oct. 2004.
Watson, Craig I., et al., User's Guide to Export Controlled Distribution of NIST Biometric Image Software (NBIS-EC), National Institute of Standards and Technology, Gaithersburg, MD, pp. 1-35, Sep. 2004.
Extended European Search Report for EP Application 15789543.4 dated Nov. 15, 2017.

* cited by examiner

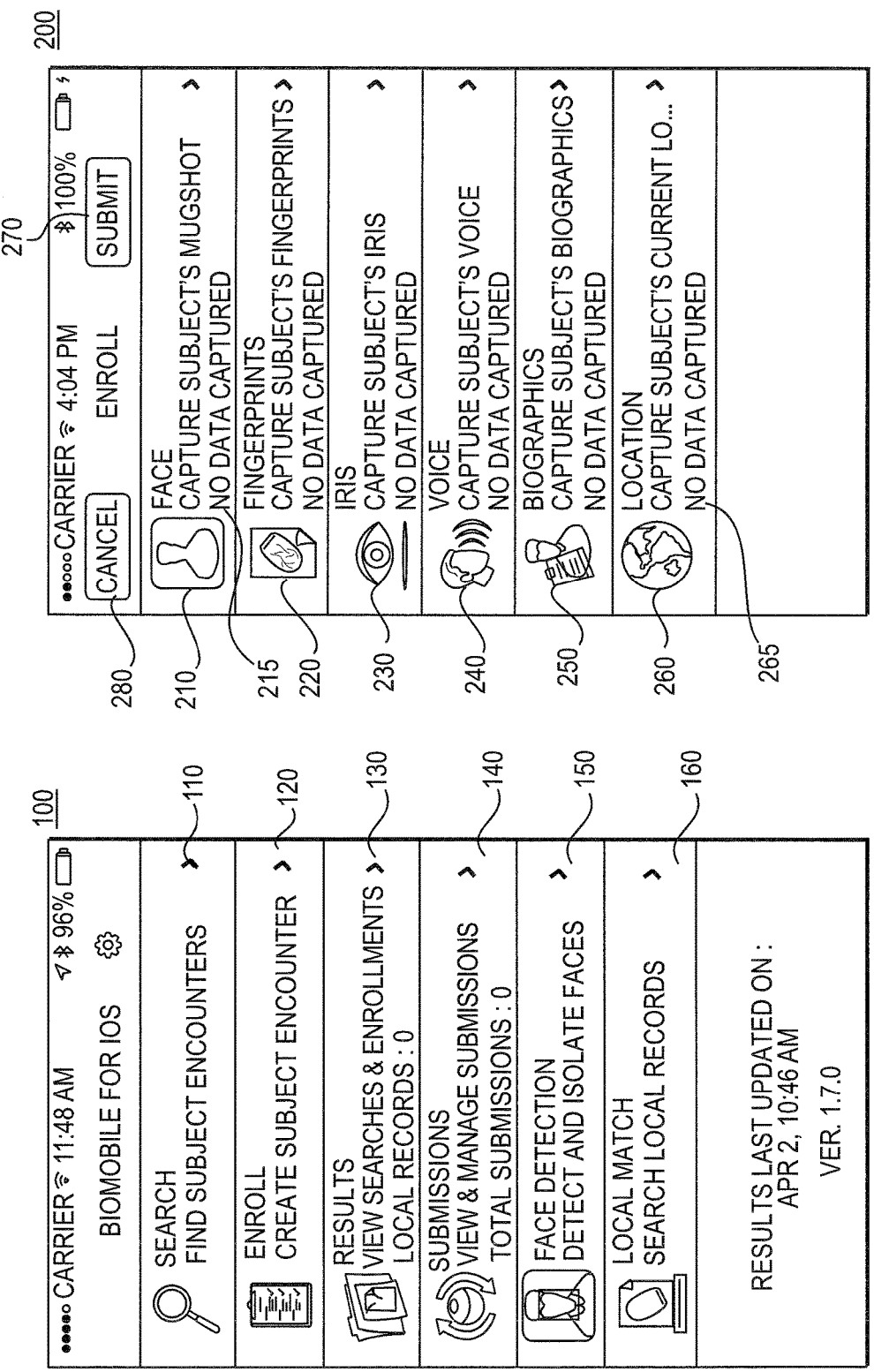

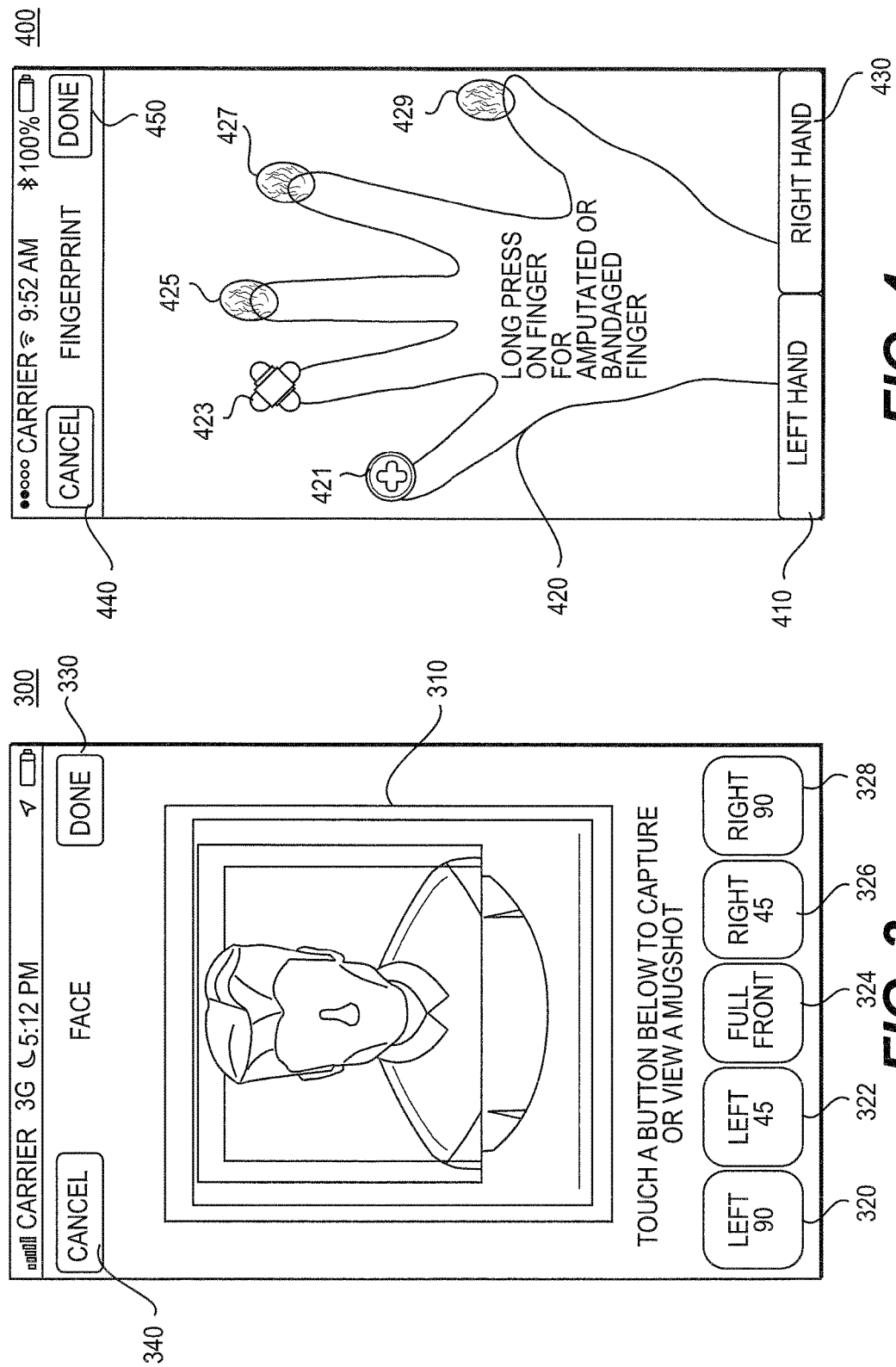

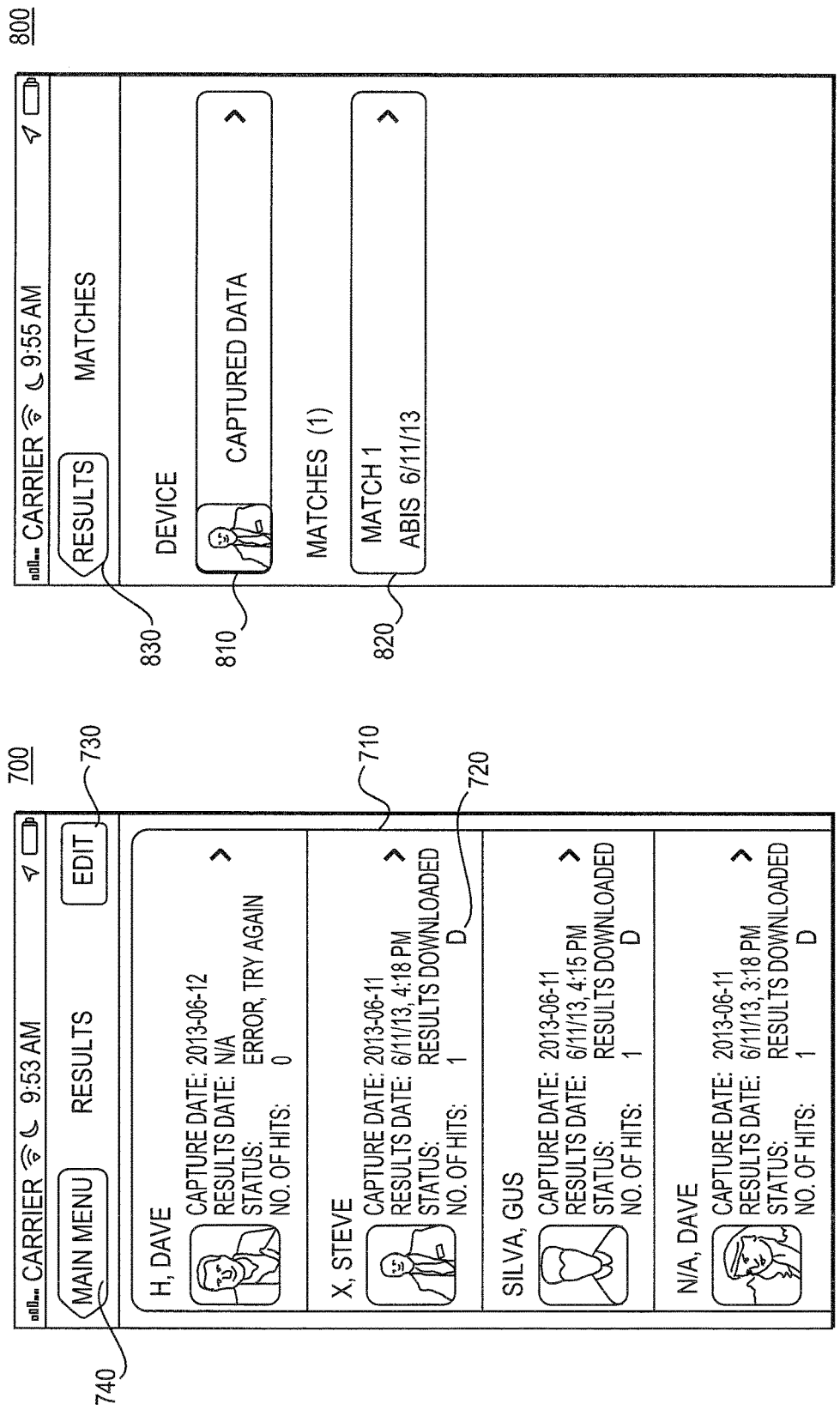

FIG. 10

CARRIER 10:21 AM
ABIS 6/11/13   ALERTS

CONTACT NAME:
GREGORY.ZARROLI@NGC.COM
CATEGORY: DETAIN - KNOWN OR
SUSPECTED TERRORIST
- OTHER COUNTRY WATCHLIST

DESCRIPTIVE TEXT: THIS IS THE
DETAILDESCRIPTIONTEXT FIELD 1000, 1040, 1010

FIG. 9

CARRIER 9:55 AM
MATCHES   ABIS 6/11/13

X, STEVE
ALERT(S):      D
BIRTH DATE:    06/11/1995
HEIGHT:        511
WEIGHT:        165
RACE:          MEXICAN
GENDER:        MALE
HAIR COLOR:    BROWN
EYE COLOR:     GRAY
COMMENTS:
COMMENT UNAVAILABLE:

ALERTS (1)
ARRESTS (1)
NAMES (1)

ABIS 6/11/13  ARREST DETAILS

ARREST:20130512123456Z
OFFENSE:20130401123456Z

ARREST DETAILS:
MURDER 1140
1110

ABIS 6/11/13  NAMES

X, STEVE 1240
1210

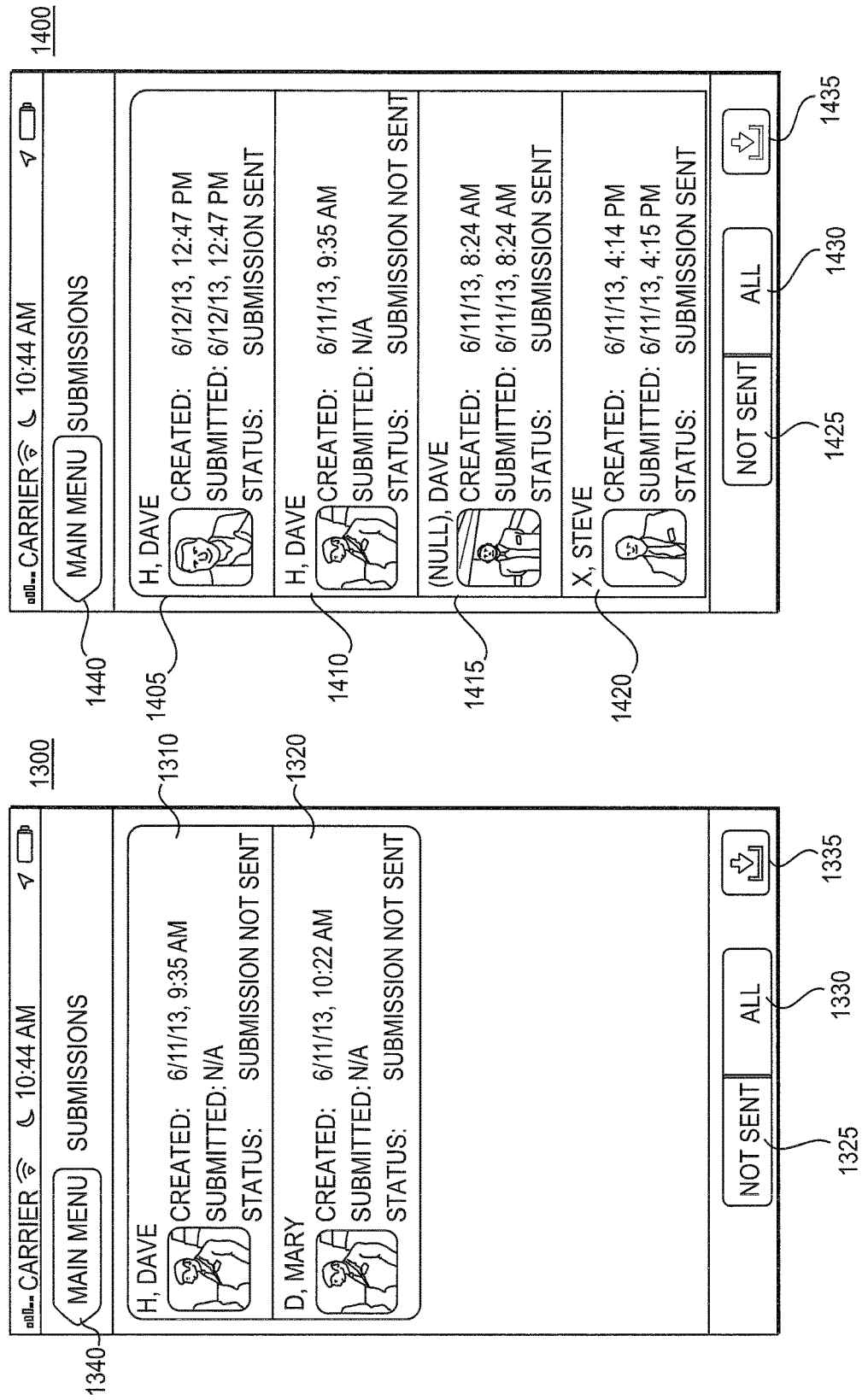

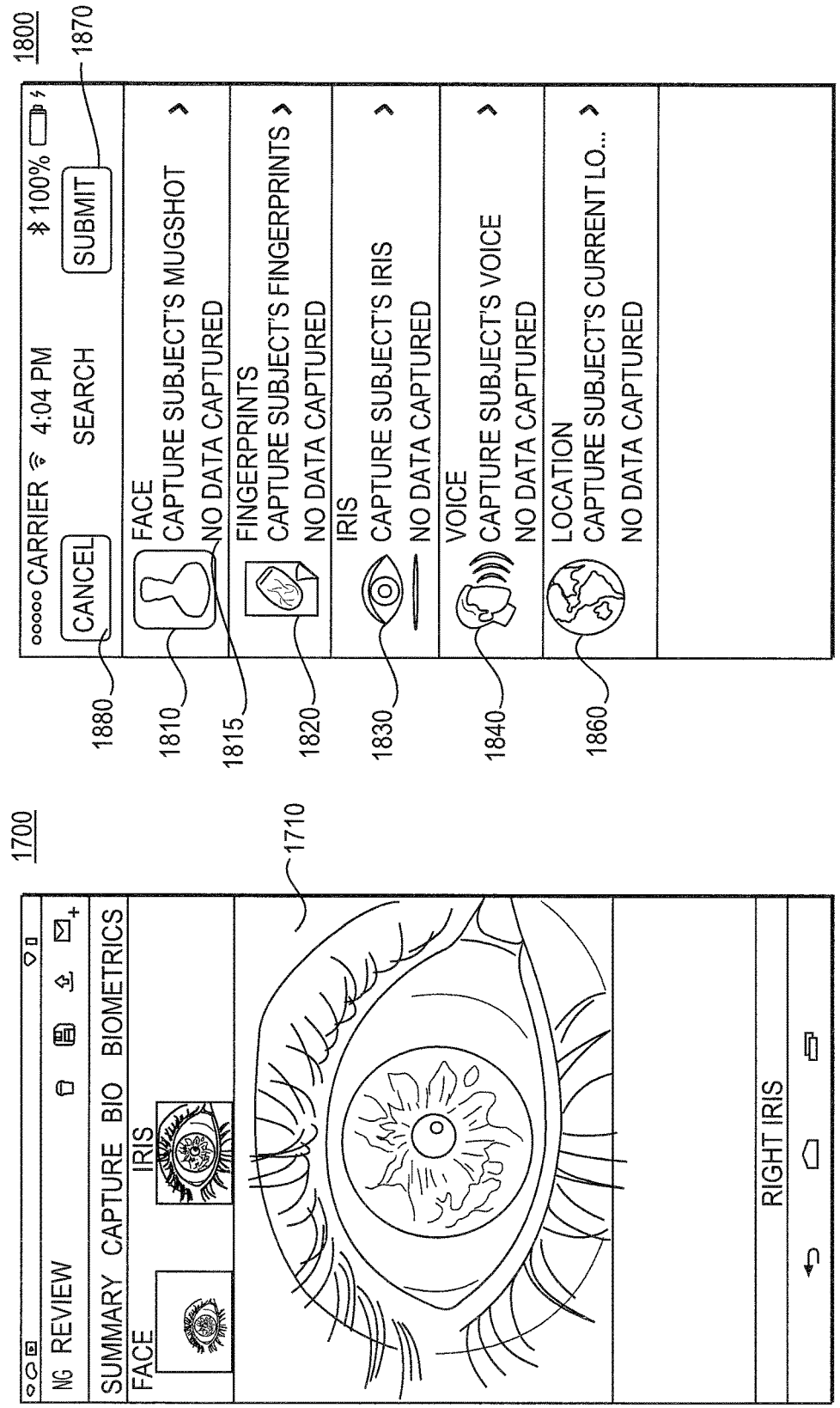

METHODS, DEVICES, AND COMPUTER-READABLE MEDIA FOR BIOMETRIC COLLECTION, QUALITY CHECKING, AND MATCHING

CROSS REFERENCE TO RELATED APPLICATIONS

This application claims priority from U.S. Provisional Patent Application No. 61/990,384, filed on May 8, 2014, which is hereby incorporated herein by reference in its entirety.

FIELD

The disclosure herein relates to the field of collection of biometric information for individual subjects, and more particularly to methods and user interface devices for capturing biometric information (e.g., fingerprints) of a subject, determining the quality of the captured biometric information, and comparing the captured information to stored information for possible matches.

BACKGROUND

Biometrics refers to the quantifiable data (or metrics) related to human characteristics and traits. Examples of biometric identifiers include fingerprints, palm prints, voice pattern, iris pattern, one or more facial images, DNA, etc. Biometric identifiers are distinctive, measurable characteristics used to label and describe individuals. The choice of a particular biometric identifier for use in a specific application involves a weighting of several factors including universality across the relevant population; uniqueness among individuals in the relevant population; permanence of a trait over time; measurability or ease of acquisition or measurement; performance in terms of accuracy, speed, and robustness; acceptability of the capture process to the individuals subject to collection; and ease of circumvention using an artifact or substitute. No single biometric identifier will meet all the requirements of every possible application and in many applications, a combination of biometric identifiers may be required.

Timely verification of identity is a critical requirement for various individuals involved in military and law enforcement operations, including soldiers in a war zone or peacekeeping zone, customs and border protection (CBP) officers working in immigration control, Federal Bureau of Investigation (FBI) agents conducting counterterrorism sweeps, and even state and local law enforcement personnel. Identity verification is often performed by capturing various biometric identifiers and comparing the captured information against records stored in repositories maintained by various governmental agencies such as National Institute of Standards and Technology (NIST), FBI, Department of Defense (DoD), and Department of Homeland Security (DHS). Moreover, many of the scenarios mentioned above also require timely initial enrollment of individuals by capturing biometric information and sending it to be stored in one or more repositories.

SUMMARY

Exemplary embodiments of the present disclosure include a user interface device (e.g., smart phone) comprising at least one processor configured with program code that, when executed by the at least one processor, causes the device to display a menu comprising one or more user-selectable options for initiating capture of biometric information for a subject; in response to a user selection, capture one or more biometric identifiers using a biometric sensor coupled to the device; and compare the captured biometric identifiers to one or more biometric templates stored in at least one memory coupled to the user interface device. The device may further include program code that configures the device to display an indication of verification of the subject's identity if the comparison indicates a match between the captured biometric identifiers and the biometric templates. The device may further include program code that configures the device to display an indication that the captured biometric identifiers comprise one or more duplicate biometric identifiers if the comparison indicates a match between the captured biometric identifiers and the biometric templates. The device may further include program code that configures the device to transmit the captured biometric identifiers to at least one remote repository if the comparison indicates no matches between the captured biometric identifiers and the biometric templates. In some embodiments, the captured biometric identifiers are fingerprints. Embodiments also include methods comprising the actions of the user interface device caused by execution of the program code, as well as computer-readable media comprising the program code.

Exemplary embodiments of the present disclosure also include a user interface device (e.g., smart phone) comprising at least one processor configured with program code that, when executed by the at least one processor, causes the device to display a menu comprising one or more user-selectable options for initiating capture of biometric information for a subject; in response to a user selection, capture one or more biometric identifiers using a biometric sensor coupled to the device; and determine one or more metrics related to the quality of the captured biometric identifiers. The device may further include program code that configures the device to transmit the captured biometric identifiers to at least one remote repository if the metrics indicate that the quality is equal to or above a threshold value. The device may further include program code that configures the device to display a message prompting the user to initiate capture of at least a portion of the one or more biometric identifiers if the one or more metrics indicate that the quality is below a threshold value. The device may further include program code that configures the device to initiate comparison of the captured biometric identifiers to one or more locally-stored biometric templates if the one or more metrics indicate that the quality is equal to or above a threshold value. In some embodiments, the captured biometric identifiers are fingerprints. Embodiments also include methods comprising the actions of the user interface device caused by execution of the program code, as well as computer-readable media comprising the program code.

DESCRIPTION OF THE DRAWINGS

The detailed description will refer to the following drawings in which like numerals refer to like items, and in which:

FIG. 1 is an exemplary home display rendered by an application program executing on a user interface device, according to embodiments of the present disclosure;

FIG. 2 is an exemplary subject enrollment display rendered by an application program executing on a user interface device, according to embodiments of the present disclosure;

FIG. 3 is an exemplary subject facial data collection display rendered by an application program executing on a user interface device, according to one or more embodiments of the present disclosure;

FIG. 4 is an exemplary subject fingerprint data collection display rendered by an application program executing on a user interface device, according to one or more embodiments of the present disclosure;

FIG. 7 is an exemplary search results display rendered by an application program executing on a user interface device, according to one or more embodiments of the present disclosure;

FIG. 8 is an exemplary search results display showing a summary of match results comprising a particular search result, rendered by an application program executing on a user interface device, according to one or more embodiments of the present disclosure;

FIG. 9 is an exemplary search results display showing details of a particular match result, rendered by an application program executing on a user interface device, according to one or more embodiments of the present disclosure;

FIG. 10 is an exemplary search results display showing details of an alert associated with a particular match result, rendered by an application program executing on a user interface device, according to one or more embodiments of the present disclosure;

FIG. 11 is an exemplary search results display showing details of an arrest associated with a particular match result, rendered by an application program executing on a user interface device, according to one or more embodiments of the present disclosure;

FIG. 12 is an exemplary search results display showing details of person names associated with a particular match result, rendered by an application program executing on a user interface device, according to one or more embodiments of the present disclosure;

FIG. 13 is an exemplary search/enrollment submission status display rendered by an application program executing on a user interface device, according to one or more embodiments of the present disclosure;

FIG. 14 is another exemplary search/enrollment submission status display rendered by an application program executing on a user interface device, according to one or more embodiments of the present disclosure;

FIG. 17 is an exemplary subject iris image collection display rendered by an application program executing on a user interface device, according to one or more embodiments of the present disclosure;

FIG. 18 is an exemplary search display rendered by an application program executing on a user interface device, according to one or more embodiments of the present disclosure;

DETAILED DESCRIPTION

Figures 5, 6:
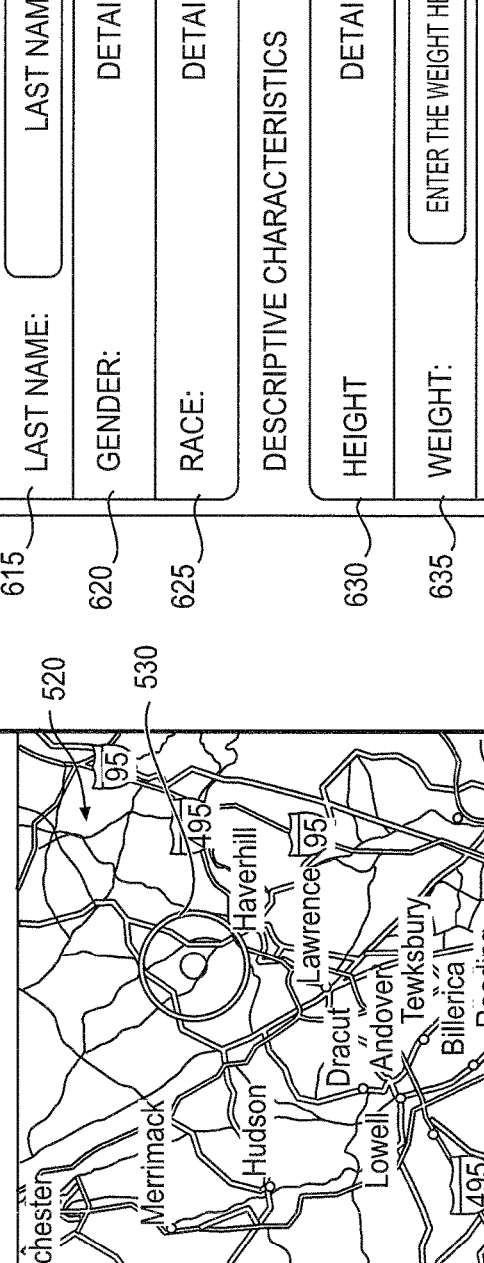
FIG. 5 is an exemplary subject location determination display rendered by an application program executing on a user interface device, according to one or more embodiments of the present disclosure.
FIG. 6 is an exemplary subject biographies data collection display rendered by an application program executing on a user interface device, according to one or more embodiments of the present disclosure.

It is to be understood that the figures and descriptions of the present invention may have been simplified to illustrate elements that are relevant for a clear understanding of the present invention, while eliminating, for purposes of clarity, other elements found in a typical user interface device or typical method for biometric information processing. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Effective biometric identification and verification in military and law enforcement operations requires robust interoperability that facilitates agents performing biometric enrollments and identity verifications with a variety of current biometric repositories. However, current systems fall far short of this high-level requirement for various reasons. First, the unique data and security requirements for each component of the system results in unreasonably complex system integrations that require substantial effort that often is not reusable for future systems. Second, because the various biometric repositories hold different sets of biometric records, each biometrics collection device must have the capability to communicate with each biometric repository in order to obtain the most complete, accurate result. Even if the device has such capability initially, changes to interfaces or standards—even routine updates—can be time consuming or even delay deployments in some situations. In addition, agents are often burdened with the tedious process of taking the results from one system and manually entering them into another system just to get meaningful responses. Finally, given the importance of such systems to national security, maintenance and repair operations must take place in a secure environment. Due to these and other shortcomings, current systems do not meet the needs for biometric enrollment and identification of military and law enforcement personnel.

To enable more efficient performance of biometric identification and enrollment, what is needed is a modular, open systems architecture separating the user or client-side application from the rapidly changing landscape of biometric capture devices, user interface devices, and back-end biometric databases. Moreover, what is needed is an application that will operate on a variety of low-cost, mobile user interface devices to facilitate directly capturing and processing of multiple biometric identifiers including, for example, fingerprints, iris images, facial images, voice samples, distinctive skin markings (e.g., scars, tattoos, etc.) and submitting this information to secure biometric repositories. Mobile connectivity allows users the freedom to submit biometric enrollments during field operations and to stay abreast of any watch list updates or results from their biometric submissions. Furthermore, what is needed is a uniform interface that allows such devices to submit and receive information from a variety of biometric repositories simultaneously in a timely, aggregated response. Moreover, such an interface must provide a minimal, well-defined attack space that can be secured against intruders by a clearly-defined perimeter while providing simple security and authentication mechanisms for the user interface devices. Such a solution enables critical biometric verification to be performed securely in at least near-real-time, and reduces both integration and maintenance costs. In addition, what is needed is to locally store on the user interface devices biometric information for individuals on watch lists (e.g., individuals to be detained) and/or white lists (e.g., individuals to be granted access or entry), such that these devices can continue critical operations when communications are unreliable.

Exemplary embodiments of the present disclosure provide these and other benefits through a user interface device (e.g., smart phone) comprising at least one processor configured with program code that, when executed by the at least one processor, causes the device to display a menu comprising one or more user-selectable options for initiating capture of biometric information for a subject; in response to a user selection, capture one or more biometric identifiers using a biometric sensor coupled to the device; and compare the captured biometric identifiers to one or more biometric templates stored in at least one memory coupled to the user interface device. The device may further include program code that configures the device to display an indication of verification of the subject's identity if the comparison indicates a match between the captured biometric identifiers and the biometric templates. The device may further include program code that configures the device to display an indication that the captured biometric identifiers comprise one or more duplicate biometric identifiers if the comparison indicates a match between the captured biometric identifiers and the biometric templates. The device may further include program code that configures the device to transmit the captured biometric identifiers to at least one remote repository if the comparison indicates no matches between the captured biometric identifiers and the biometric templates. In some embodiments, the captured biometric identifiers are fingerprints. Embodiments also include methods comprising the actions of the user interface device caused by execution of the program code, as well as computer-readable media comprising the program code.

Exemplary embodiments of the present disclosure also include a user interface device (e.g., smart phone) comprising at least one processor configured with program code that, when executed by the at least one processor, causes the device to display a menu comprising one or more user-selectable options for initiating capture of biometric information for a subject; in response to a user selection, capture one or more biometric identifiers using a biometric sensor coupled to the device; and determine one or more metrics related to the quality of the captured biometric identifiers. The device may further include program code that configures the device to transmit the captured biometric identifiers to at least one remote repository if the metrics indicate that the quality is equal to or above a threshold value. The device may further include program code that configures the device to display a message prompting the user to initiate capture of at least a portion of the one or more biometric identifiers if the one or more metrics indicate that the quality is below a threshold value. The device may further include program code that configures the device to initiate comparison of the captured biometric identifiers to one or more locally-stored biometric templates if the one or more metrics indicate that the quality is equal to or above a threshold value. In some embodiments, the captured biometric identifiers are fingerprints. Embodiments also include methods comprising the actions of the user interface device caused by execution of the program code, as well as computer-readable media comprising the program code.

FIG. 1 is an exemplary home screen display (also known as a "main screen") of an application program for execution on a user interface device, according to embodiments of the present disclosure. Display 100 comprises several main display elements including Search 110, Enroll 120, Results 130, Submissions 140, Face Detection 150, and Local Match 160. Each of these main display elements corresponds to a particular type of functionality or information and each display element occupies a clearly defined area of display 100. In some embodiments, when a user of the user interface device touches the screen within a particular defined area (e.g., within the boundaries of Search 110), the application program receives an indicator that the user has selected the element corresponding to that defined area and executes a corresponding action, such as displaying another screen corresponding to the selected element.

The main display elements also may include summary or high-level information related to the corresponding functionality. For example, as shown in FIG. 1, Results 130 may provide a summary (e.g., a quantity) of the biometric records stored locally on the device. By further example, Submissions 140 may provide a summary (e.g., a quantity) of biometric searches and/or enrollments made by the device to an external entity, such as a database or server.

When a user touches display element Enroll 120, the application program renders the Enroll screen display 200 shown in FIG. 2. For example, the user may touch Enroll 120 if he or she desires to capture biometric data for a subject and submit the captured data to be stored as a biometric template either locally or remotely, e.g., in a database. Display 200 comprises display elements Face 210, Fingerprints 220, Iris 230, Voice 240, Biographies 250, and Location 260 that provide the user with the capability to initiate collection of the respective biometric data. Each of display elements 210-260 include a status indicator that indicates the collection status for the corresponding biometric information. For example, indicators 215 and 265 indicate that neither facial data nor location data has been collected for the subject. In addition, display 200 also comprises display element Submit 270, which provides the user with the capability to initiate enrollment by submitting the biometric data captured for the subject to, for example, a biometric database.

In some embodiments, the application may render a pop-up window to allow the user to confirm prior to submission. In some embodiments, the enrollment data may be saved locally (e.g., in a memory embedded in or removably connected to the device) and transmitted to a server (e.g., a biometric data brokerage system server) that is an intermediary between the application and one or more biometric databases (e.g., DoD ABIS, AFIS, IDENT1, etc.). In some embodiments, the application may display a menu of biometric databases from which the user can select the particular ones to submit the enrollment information. The user may view the status of a submitted search by selecting Submissions 140 action button in display 100 of FIG. 1, as discussed in more detail below. In addition, display 200 includes display element Cancel 280, which provides the user with the capability to cancel the collection of biometric data for the subject, discard any collected data, and return to display screen 100.

If the user touches an area of display 200 corresponding to Face 210, the application program receives an indication of the user selection and changes the screen display to display 300 shown in FIG. 3. Display 300 may comprise one or more user action buttons, including Left 90 320, Left 45 322, Full Front 324, Right 45 326, Right 90 328, Done 330 and Cancel 340. By touching one of action buttons 320-328, the user may initiate capture of a facial image of the subject. For example, by touching Full Front 324, the user may initiate capture of a full-frontal facial image of the subject by a camera embedded within, or attached to, the device. After touching one of action buttons 320-328, an image of the field of view of the camera will be shown in Frame 310. After the user satisfactorily frames the desired image of the subject, the user may touch the particular action button again to capture and store the image. In some embodiments, display 300 may include a "camera" icon (not shown in FIG. 3) that the user may touch to capture the image. In some embodiments, after capturing the image, the application may provide the user with the capability to discard the captured image prior to storage (e.g., retake the picture). In some embodiments, the application may include a default mode in which display 300 is initially rendered to show the field of view of the camera in Frame 310 for capture of a full-frontal image of the subject. This may be indicated, for example, by rendering Full Front 324 action button in a different color scheme.

The user may capture images for different views of the subject in this manner, initiating the capture by pressing the particular action button 320-328 that corresponds to the desired view. In some embodiments, once an image corresponding to a particular view has been captured, the application will render the action button 320-328 corresponding to that view as a thumbnail of the captured image. If the user desires to capture a different image for that particular view, the user may initiate this by touching the thumbnail. If the user presses Done 330, the application saves the captured images and returns to display 200, where indicator 215 will be updated to indicate captured facial image(s) for the subject. On the other hand, if the user presses Cancel 340, the application returns to display 200 without saving any images captured of the subject.

Returning to FIG. 2, if the user touches an area of display 200 corresponding to Fingerprints 220, the application program receives an indication of the user selection and changes the screen display to display 400 shown in FIG. 4. Display 400 may comprise one or more user action buttons, including Left Hand 410, Right Hand 430, Cancel 440, and Done 450. If the user selects either of Left Hand 410 or Right Hand 430, the application will render an image 420 on display 400 corresponding to the selected hand, e.g., the left hand shown in FIG. 4. In some embodiments, the application may include a default mode in which display 400 is initially rendered to display an image 420 of a particular hand, e.g., the left hand shown in FIG. 4. This may be indicated, for example, by rendering Left Hand 410 action button in a different color scheme.

For a selected hand, display 400 also may comprise action buttons corresponding to each fingerprint that has not been collected. For example, display 400 includes an action button 421 corresponding to the left-most finger (e.g., pinky finger) on the left hand of the subject. If the user presses an action button (e.g., 421) corresponding to a missing fingerprint, the application will display a message prompting the user to place the finger on a fingerprint scanner embedded in or connected to the device. An exemplary fingerprint scanner that is suitable for this purpose is the FbF® mobileOne cradle, available from Fulcrum Biometrics, Inc. Once the user has collected the desired fingerprint, the application updates display 400 to include a thumbnail of the collected fingerprint in association with the finger, e.g., thumbnails 425, 427, and 429 shown in FIG. 4. In some embodiments, the application may be capable of determining that no fingerprint is available for a particular finger, e.g., the finger is amputated, bandaged, or in a cast. This may be done, for example, sensing an extra-long press or selection of an action button (e.g., 421) corresponding to a missing fingerprint. Once the application detects this condition, the application updates display 400 to include an indication of the unavailable fingerprint, e.g., icon 423 shown in FIG. 4. Action buttons Done 450 and Cancel 440 provide the same functionality as the corresponding action buttons in FIG. 3 described above.

In some embodiments, the application can perform quality analysis of the collected fingerprints either during or after the collection process. For example, the application may utilize the National Institute of Standards & Technology (NIST) Fingerprint Image Quality (NFIQ) algorithm to determine quality of the collected fingerprint(s). The NFIQ algorithm is described in E. Tabassi, et al., "Fingerprint Image Quality," NIST Tech. Rep. 7151, August 2004, the entirety of which is incorporated herein by reference. To briefly summarize, NFIQ computes a feature vector using an image map and quality statistics of fingerprint minutiae (e.g., details) that are computed by a minutiae detector such as minutiae detection algorithm (MINDTCT) that automatically locates and records ridge endings and bifurcations in a fingerprint image. NFIQ then uses the computed feature vector as an input into a multi-layer perceptron (MLP) neural network, which classifies the fingerprint quality with an integer metric value between 1 (best) to 5 (worst), with values of 1 and 2 generally considered as acceptable quality.

After computing the fingerprint quality metric, the application may store this quality metric in association with the collected fingerprint(s). In some embodiments, the application may display the computed fingerprint quality metric to the user. In some embodiments, the application may prompt the user to repeat the fingerprint collection process for the subject if the metric indicates unacceptable fingerprint quality. In some embodiments, the application may give the user the option to store the collected fingerprint(s) even though the metric indicates unacceptable quality. In some embodiments, the application may condition submission of the collected fingerprint(s) for identification or enrollment based upon an acceptable quality metric determined for the collected fingerprint(s).

Returning to FIG. 2, if the user touches an area of display 200 corresponding to Iris 230, the application program receives an indication of the user selection and activates an iris scanner that is embedded in or removably attached to the device. In some embodiments, the camera embedded within the device may be used for this purpose, according to its capabilities, such as image resolution, noise, etc. An exemplary attachable iris scanner that is suitable for this purpose is the IriShield MK2120U USB monocular iris camera, manufactured by Iritech, Inc. In either case, the application may render a display screen that includes the image currently being captured by the iris scanner, e.g., a viewfinder screen. An exemplary display screen is display 1700 shown in FIG. 17, which includes image 1710 of a subject's eye currently being captured by the iris scanner. In various exemplary embodiments, display 1700 may include various other features and action buttons (not shown) that enable the user to select left or right eye, capture the image, preview the image, indicate existence of captured images for each eye, cancel (or save) and return to previous screen, etc., similar to the fingerprint-related features and action buttons described above with reference to FIG. 4.

Figure 19:
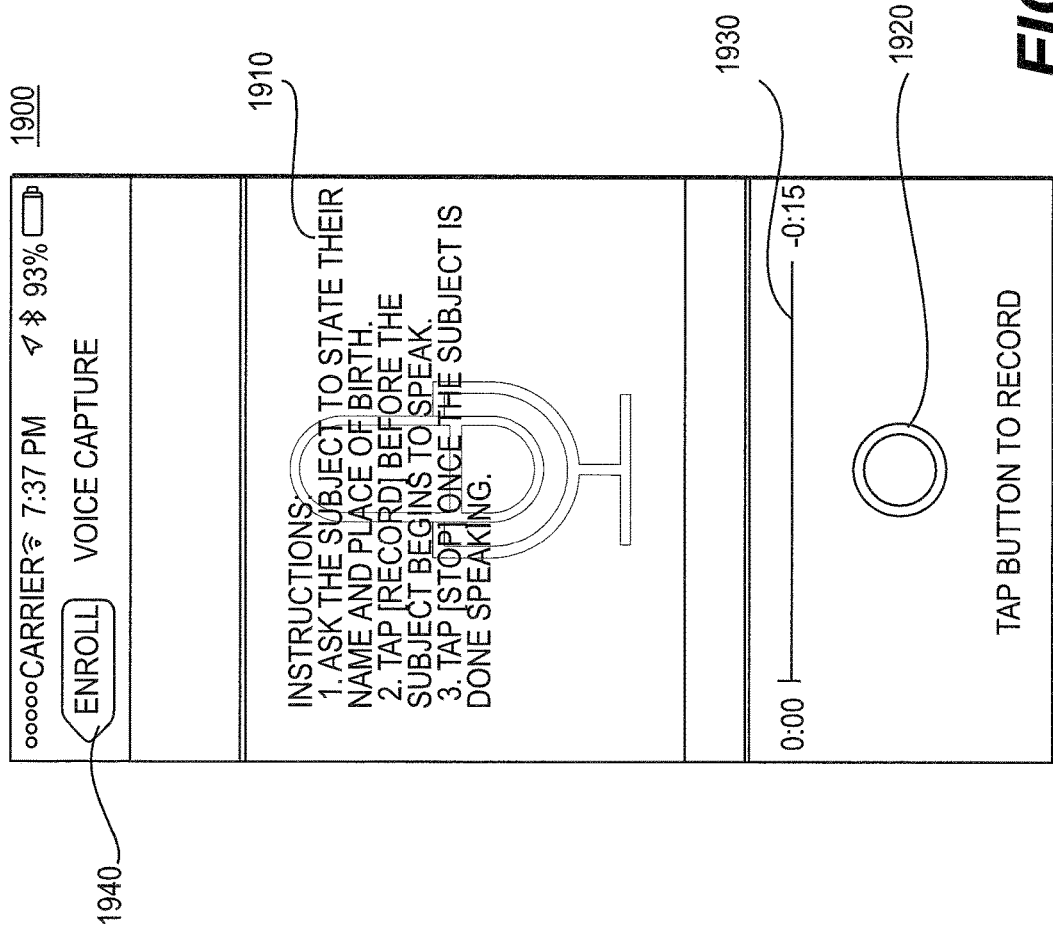
FIG. 19 is an exemplary subject voice sample collection display rendered by an application program executing on a user interface device, according to one or more embodiments of the present disclosure.

Returning to FIG. 2, if the user touches an area of display 200 corresponding to Voice 240, the application program receives an indication of the user selection and activates an audio capture device that is embedded in or removably attached to the device. In some embodiments, one or more microphones embedded within the device may be used for this purpose, according to their capabilities, such as bandwidth and/or distortion. In either case, the application may render a display screen that includes various features and action buttons that enable the user to capture the voice, preview the captured voice, indicate existence of captured voice for a subject, cancel (or save) and return to previous screen, etc., similar to the fingerprint-related features and action buttons described above with reference to FIG. 4. An exemplary voice collection display screen 1900 is shown in FIG. 19. Display 1900 comprises instructions 1910 that instruct the user how to initiate capture the voice sample of the subject by selecting record action button 1920, then to terminate capture by selecting stop action button (not shown), which will appear in place of button 1920 once recording starts. The user may preview particular portions of the recording utilizing slide bar selector 1930 which may also display the overall length of the recording. If the user selects action button Enroll 1940, the application stores the captured voice sample and returns to display 200, where the relevant indicator will be updated to indicate captured voice information for the subject.

Returning to FIG. 2, if the user touches an area of display 200 corresponding to Location 260, the application program receives an indication of the user selection and changes the screen display to display 500 shown in FIG. 5. Display 500 may comprise Use Location 510 action button that, if in the "On" position as shown FIG. 5, will cause the application to determine the user's current position using available location technology, e.g., GPS, location of a serving cellular base station or WiFi access point, cell-site triangulation, etc. In some embodiments, the default position of Use Location 510 action button may be "On", while in other embodiments, the default position may be "Off". Once a location is determined, the application may render it in one or more ways on display 500, including as Longitude 532 and Latitude 534; as a map 520 of the area surrounding the location; and as a particular location point and/or uncertainty on map 520, such as uncertainty area 530. If the user selects action button Enroll 540, the application stores the location data (if available) and returns to display 200, where indicator 265 will be updated as necessary to indicate captured location information for the subject.

Returning to FIG. 2, if the user touches an area of display 200 corresponding to Biographies 250, the application program receives an indication of the user selection and changes the screen display to display 600 shown in FIG. 6. Display 600 may comprise personal information for the subject, such as exemplary fields First Name 610, Last Name 615, Gender 620, Race 625, Height 630, Weight 635, and Hair Color 640 shown in FIG. 6. The user may initiate data entry into a particular field by touching the display area corresponding to that field. After detecting the user's selection, the application may provide various ways for the user to enter data. For example, if the user selects a First Name 610 which has associated a free-form data entry field 680, the application may display a virtual keyboard for the user to enter various characters, e.g., alphabetic and/or numeric characters. By further example, if the user selects a field (e.g., Gender 620) with a limited number of possible values as indicated by a field 690, the application may display a set of options from which the user can select. The application may render these options in the form of a drop-down pick list (e.g., Gender 620), a slider bar between two ends of a range (e.g., Height 630 and/or Weight 635), or other user interface displays known to persons of ordinary skill. Action buttons Done 650 and Cancel 660 shown in FIG. 6 provide the same functionality as the corresponding action buttons of display 300 in FIG. 3 described above.

Returning to FIG. 1, if the user touches an area of display 100 corresponding to Search 110, the application program receives an indication of the user selection and changes the screen display to display 1800 shown in FIG. 18. For example, the user may touch Search 110 if he or she desires to capture biometric data for a subject and compare this data to biometric templates stored in a remote database to determine a match. In some embodiments, the comparison of this data can be made to biometric templates stored in memory embedded in or removably connected to the device. The options available to the user through display 1800 are identical to the options available to the user through Enroll display 200 described above with reference to FIG. 2, with the exception that the option to enter biographic information (e.g., Biographies 250 in display 200) is not available in Search display 1800.

Returning to FIG. 1, if the user touches an area of display 100 corresponding to Results 130, the application program receives an indication of the user selection and changes the screen display to display 700 shown in FIG. 7. For example, the user may touch Results 130 if he or she desires to view the results of previously submitted searches. In some embodiments, search results may be stored in memory embedded in or removably connected to the device. In other embodiments, search results may be stored remotely, e.g., in a server or database, with an indication of available sent to the device, which may retrieve such results upon the user selecting Results 130. In either case, display 700 may comprise one or more result fields, each of which corresponds to and provides summary data for a search result. For example, result field 710 shows summary data for the search result for "Steve X". The summary data may include one or more flags that indicate a particular status for the subject of the search result. For example, flag 720 ("D") associated with result 710 indicates that the subject should be detained or arrested. Display 700 also may comprise an Edit 730 action button. In addition, display 700 may comprise a Main Menu 740 action button that, if touched by the user, will cause the application to exit display 700 and render the main (or home) menu display described above with reference to FIG. 1.

If the user touches an area of display 700 corresponding to a particular search result, the application program receives an indication of the user selection and changes the screen display to display more details of the particular search result. For example, if the user selects result 710, the application renders display 800 shown in FIG. 8, which displays match results for the search corresponding to "Steve X". Display 800 may comprise one or more match result fields, such as field 820, and a captured data field 810. If the user selects captured data field 810, the application may render a display screen showing any data captured for the subject of the search (e.g., "Steve X"). An exemplary screen showing captured data for a subject is display 1500 shown in FIG. 15. Display 1500 may comprise various information fields related to the subject, such as fields 1510, 1520, 1530, and 1540. One or more of these fields may be user-selectable, causing the application to render a different display showing additional and/or more detailed information about the subject. For example, user selection of field 1520 or 1530 may cause the application to render displays showing facial data or fingerprint data, respectively, if such data is available as indicated by the parenthetical numeral in the particular field. Display 1500 may comprise a Matches 1550 action button that, if selected by the user, will cause the application to exit display 1500 and render Matches display 800 described above with reference to FIG. 8.

Returning to FIG. 8, display 800 may similarly comprise a Results 830 action button that, if touched by the user, will cause the application to exit display 800 and render the Results display 700 described above with reference to FIG. 7. In addition, if the user touches an area of display 800 corresponding to a particular match result, the application program receives an indication of the user selection and changes the screen display more details of the particular match result. For example, if the user selects match result 820 (corresponding to the ABIS database), the application renders display 900 shown in FIG. 9. Display 900 may comprise a field 910 that displays various biographic data about the search subject, such as the exemplary biographic data shown in FIG. 9. Display 900 may comprise a Matches 940 action button that, if touched by the user, will cause the application to exit display 900 and render Matches display 800 described above with reference to FIG. 8.

In addition, display 900 may comprise fields 920, 925, and 930 that respectively indicate the number of alerts, arrests, and names found for the subject in the particular search result. If the user selects any of fields 920, 925, and 930, the application may render a display screen showing more detailed results corresponding to that particular item. For example, user selection of field 920 may cause the application to render display 1000 in FIG. 10, which shows alerts pertaining to the subject, e.g., in field 1010. Similarly, user selection of field 925 may cause the application to render display 1100 in FIG. 11, which shows arrests pertaining to the subject, e.g., in field 1110. User selection of field 930 may cause the application to render display 1200 in FIG. 12, which shows various names used by the subject as identified in the search results, e.g., in field 1210. Each of displays 1000, 1100, and 1200 may also comprise an action button (e.g., ABIS 6/11/13 1040, 1140, 1240) that, if touched by the user, will cause the application to exit the respective display and render the display 900 described above with reference to FIG. 9.

Returning to FIG. 1, if the user touches an area of display 100 corresponding to Submissions 140, the application program receives an indication of the user selection and changes the screen display to display 1300 shown in FIG. 13. For example, the user may touch Submissions 140 if they desires to view the status of the various enrollment and search requests previously initiated. Display 1300 may comprise one or more information fields showing various information about search or enrollment requests 1310, 1320 that were completed and saved but not submitted (e.g., due to lack of network connectivity). If the user selects the Submit 1335 action button, this causes the application to initiate submission of the listed requests 1310, 1320. Alternately, the user may select the All 1330 action button, causing the application to render display 1400 shown in FIG. 14, which includes fields corresponding to all search and enrollment requests 1405, 1410, 1415, 1420 (i.e., submitted and not submitted). The All 1430 action button corresponds to All 1330 action button. If the user selects the Submit 1435 action button, this causes the application to initiate submission of the listed requests, preferably non-submitted, but both non-submitted and a resubmission of those requests already submitted may be contemplated. The user may select the Not Sent 1425 action button (corresponding to Not Sent 1325 action button in FIG. 13) to cause the application to render display 1300 showing only non-submitted requests. Each of displays 1300 and 1400 may comprise a Main Menu action button (e.g., 1340, 1440) that, if selected by the user, will cause the application to exit the respective display and render main menu display 100 described above with reference to FIG. 1.

Returning to FIG. 1, if the user touches an area of display 100 corresponding to Local Match 160, the application program receives an indication of the user selection and renders a display screen that enables the user to initiate capture of one or more fingerprints from a subject and compare the captured fingerprints to fingerprints comprising one or more subject biometric templates that are stored locally on the device. In some exemplary embodiments, the locally-stored subject biometric templates may comprise a "watch list" of persons of interest or who are wanted by law enforcement officials. In some exemplary embodiments, the locally-stored subject biometric templates may comprise a "white list" of persons who are permitted access or entry. In some exemplary embodiments, the locally-stored subject biometric templates may comprise fingerprints that were previously captured by the device, such that the comparison may be used to determine if duplicate fingerprints have been captured.

For example, the application may provide a display comprising a field such as Fingerprints 220 in FIG. 2, the user selection of which will cause the application to display a fingerprint capture screen such as display 400 show in FIG. 4, the operation of which is described above. Moreover, the application may provide the user with the ability to select a particular template or a particular fingerprint to compare against captured fingerprints; alternately, the application may compare the one or more captured fingerprints against all fingerprints stored locally in subject templates, or against all locally-stored fingerprints for the particular finger (e.g., left index).

Figures 15, 16A:
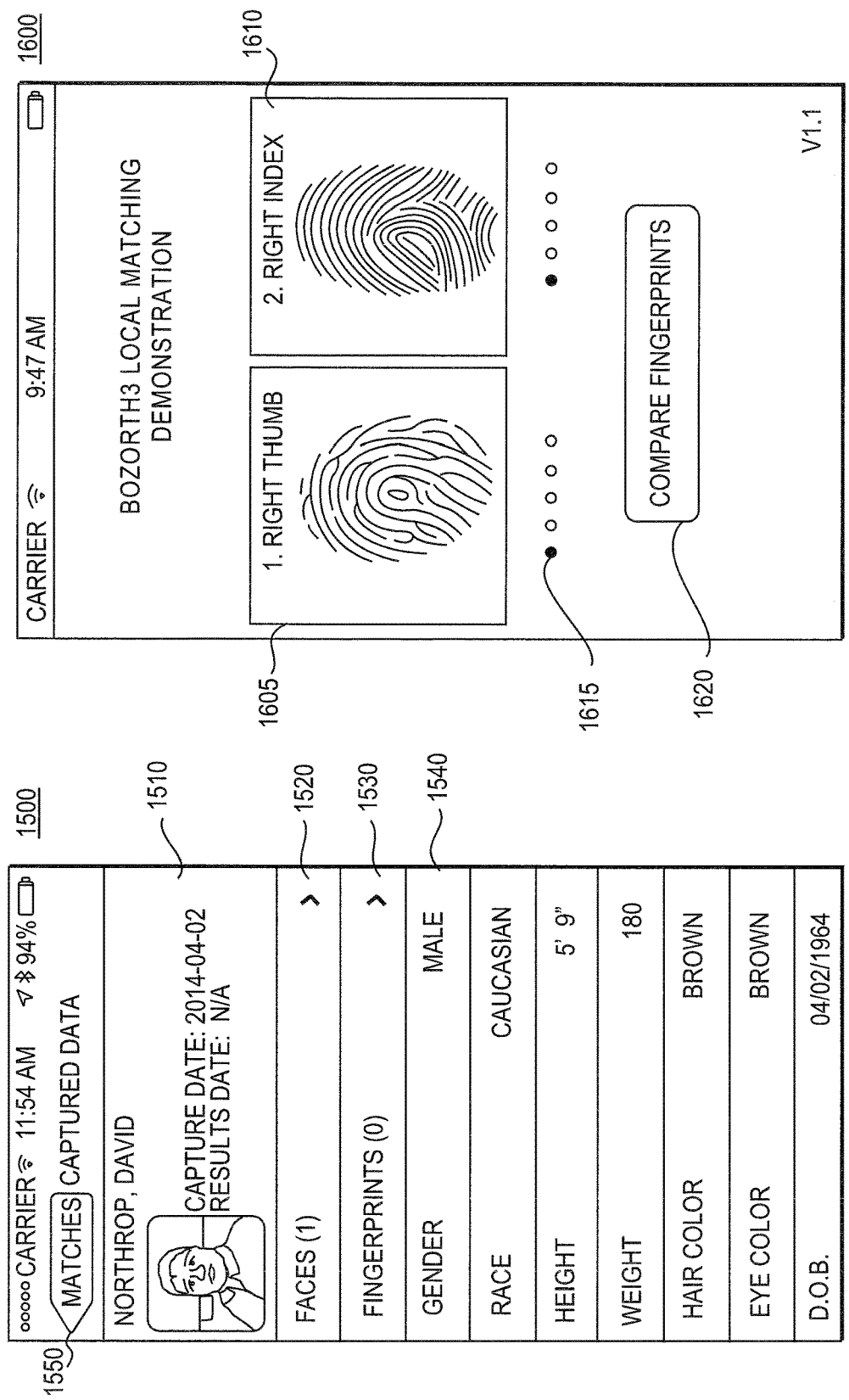
FIG. 15 is an exemplary search results display showing biographic details of a particular match result, rendered by an application program executing on a user interface device, according to one or more embodiments of the present disclosure.
FIGS. 16A-16C are an exemplary local match results display rendered by an application program executing on a user interface device, according to one or more embodiments of the present disclosure.

In any event, once the user has captured the desired fingerprints and selected (as applicable) the target fingerprints for comparison, the application renders a display screen such as display 1600 shown in FIG. 16A. Display 1600 may comprise images of the two fingerprints being compared, such as image 1605 of a subject fingerprint and image 1610 of a template fingerprint. Moreover, display 1600 may comprise an action button 1620, the selection of which by the user may cause the application to initiate comparison of the fingerprints.

Fingerprint comparison or matching may be performed by any algorithm known to persons of ordinary skill. One exemplary algorithm suitable in various embodiments is BOZORTH3, described in "User's Guide to Export Controlled Distribution of NIST Biometric Image Software" published by NIST, the entirety of which is incorporated herein by reference. Although BOZORTH3 is described in the "User's Guide to Export Controlled Distribution of NIST Biometric Image Software", it has been determined that the export control restriction does not apply to the BOZORTH3 software, due to being outside the scope of Export Administration Regulations (EAR) (specifically, Part 734.3 of EAR), and is freely distributed and considered public domain. To summarize, BOZORTH3 is a fingerprint matching algorithm that computes a match score between the minutiae from any two fingerprints. BOZORTH3 uses the location (x, y) and orientation (θ) of the minutia points to match the fingerprints. It also uses minutiae mapping information and minutiae quality statistics produced by the MINDTCT minutiae detection algorithm described above. BOZORTH3 can be configured to perform either one-to-one or one-to-many matching and is rotational- and translational-invariant.

In more detail, BOZORTH3 builds separate tables for the fingerprints being matched that define distance and orientation between minutiae in each fingerprint. The algorithm then compares these two tables for compatibility and constructs a new table to store information showing the inter-fingerprint compatibility, which is used to create a match metric by determining the size and number of compatible minutiae clusters. In general, the match metric is high if the two sets of input minutiae are from the same finger of one subject, and low if they're from different fingers. The match metric approximately represents the number of minutiae that can be matched between the two fingerprints. As a rule of thumb, a metric of greater than 40 usually indicates a true match.

Figure 16C:
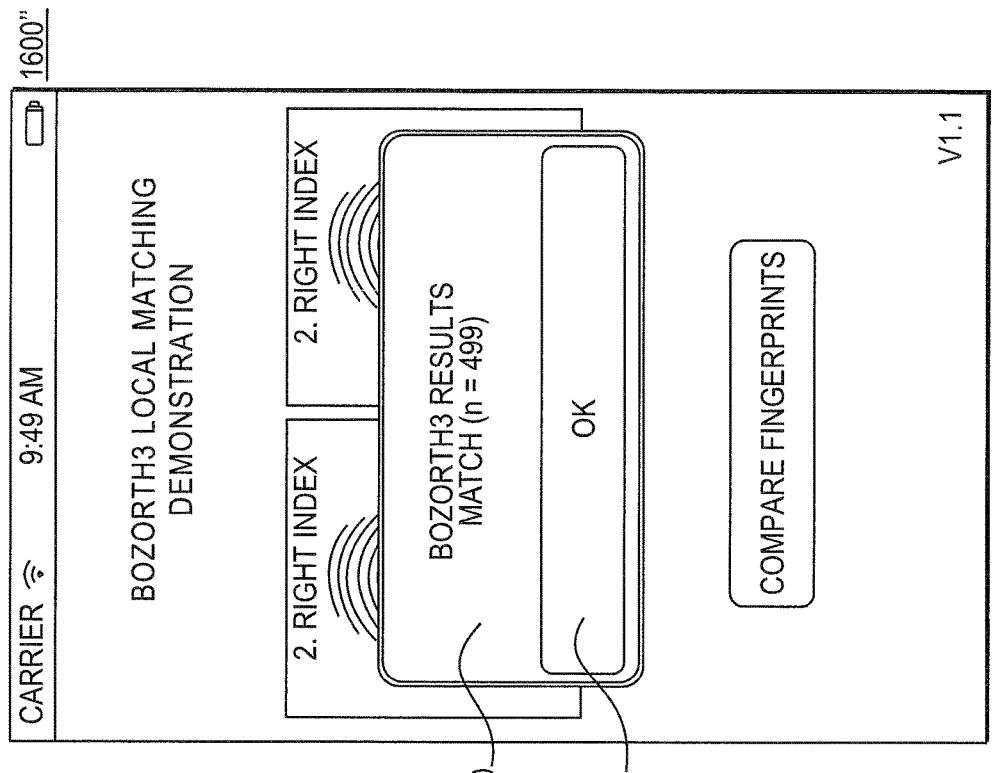
Figure 16B:
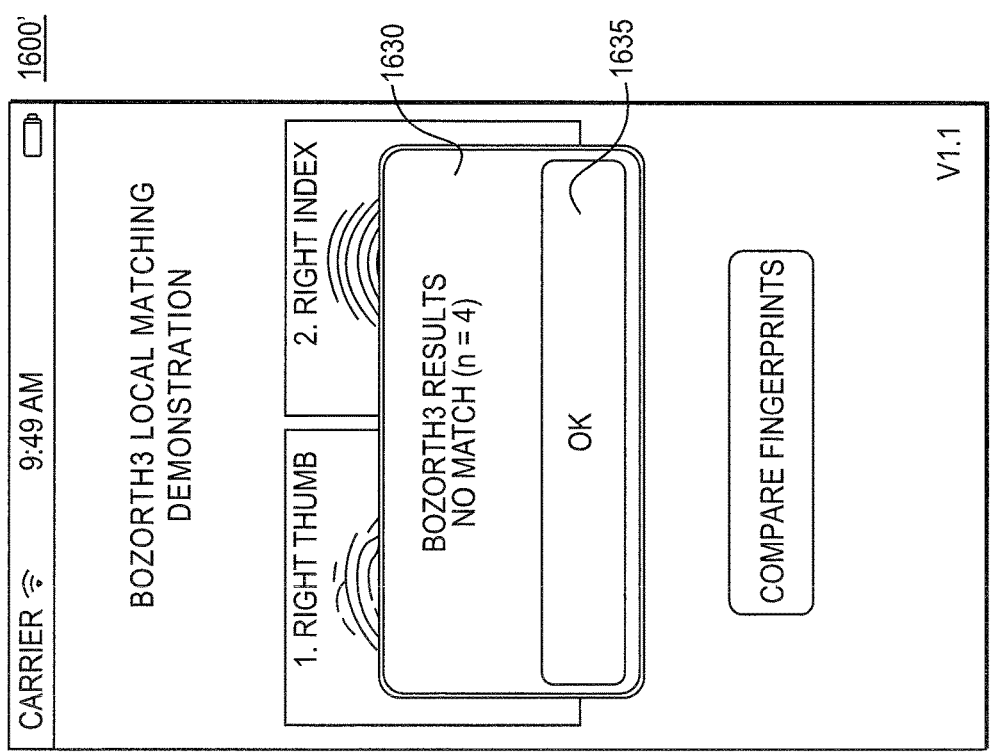

After the comparison of one or more fingerprints has been completed, the application renders a results display, such as displays 1600' and 1600" shown in FIGS. 16B and 16C, respectively. Each of these displays may comprise an information field, such as fields 1630 and 1640, that include a qualitative "match"/"no match" indicator as well as a quantitative metric (n) that indicates the degree of match. The indicator and metric shown in FIGS. 16B and 16C are merely exemplary, and others can be used as necessary or convenient according to the algorithm, user interface constraints, mission requirements, etc. Each of displays 1600' and 1600" may further comprise an action button 1635, the selection of which by the user will cause the application to remove the result display and again render display 1600 shown in FIG. 16A.

In the exemplary embodiments described herein, menu items may be displayed in various orders, including but not limited to alphabetical, numerical, chronological, contextual (e.g., distance from current location, frequency of access or use, relevance, etc.), and combinations thereof. Moreover, menu items may be displayed in either forward or reverse of any of the above orders (e.g., reverse alphabetical order). Other ways of displaying and manipulating menus and other information such as that shown in FIGS. 1 through 19 will be apparent to persons of ordinary skill in the art. The determination of relevance based on the user's context can be performed on the device itself, or it can be performed by a server with the results communicated to the device, in a manner such that the user would not notice an impact to the execution speed of the application program. The provision of context-sensitive information could be incorporated in any of the display screens shown in FIGS. 1 through 19, as well as other display screens provided by the application program.

In embodiments where the user interface device comprises a touch screen display, the user may select any display element shown in any of FIGS. 1 through 19 by touching an area on the touch screen display that corresponds to, relates to, is associated with, or is within a visible boundary of that display element. In these embodiments, the user may select an item from a single menu or hierarchical series of menus and/or sub-menus by dragging a finger along the screen area corresponding to the displayed menus then releasing it in the area corresponding to the final selection. The user also may scroll up and down through menu items, e.g., by swiping a finger vertically on the area of the screen displaying the menu items. The user also may apply various finger gestures to the touch screen display of the user interface device, which will cause the application program to manipulate the display of visual representation by, e.g., scaling (zooming), panning, rotating about an axis, etc. Any number of different single- or multi-finger gestures may be chosen to correspond to a particular manipulation, although certain choices may be preferred due to their familiarity to users of the user interface device (e.g., pinch two fingers to zoom out, spread two fingers to zoom in) or to persons of ordinary skill in the art. Other ways of manipulating information such as that shown in FIGS. 1 through 19 in touch screen display embodiments will be apparent to persons of ordinary skill in the art.

In other embodiments, the user interface device may comprise a non-touch screen display and a user input device that is physically separate from the display, such as a keyboard and/or a mouse. In these embodiments, the user may select a display element by, for example, using the mouse to position a cursor over the desired element and clicking a button on the mouse to select the element, as known to persons of ordinary skill in the art. Similarly, the user may select an item from a single menu or hierarchy of menus and/or sub-menus by dragging a finger along the screen area corresponding to the displayed menus then releasing it in the area corresponding to the final selection. Other ways of manipulating information such as that shown in FIGS. 1 through 19 in non-touch screen display embodiments will be apparent to persons of ordinary skill in the art.

Figure 20:
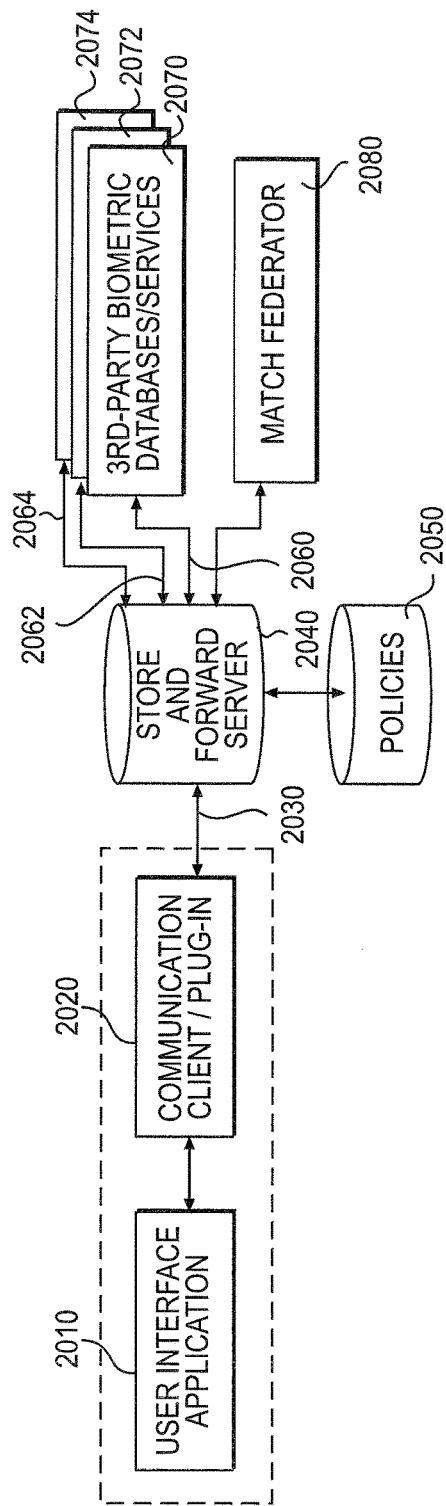
FIG. 20 is a block diagram of an exemplary client-server architecture, according to one or more embodiments of the present disclosure.

In some exemplary embodiments, the user interface device may further comprise a client or plug-in application that, when executed, causes the device to communicate with a biometric intermediary server, such as a biometric data brokerage system server. FIG. 20 is a block diagram of an exemplary client-server system architecture, the components of which are described as follows. In some embodiments, user interface application 2010 may comprise the application described above with respect to FIGS. 1 through 19. Application 2010 communicates with communication client (or plug-in) 2020. For example, application 2010 may provide information captured during enrollment and search activities, as described above, to client 2020. In some embodiments, client 2020 is a component of the executable code stored in the program memory of the user interface device. Although application 2010 and client 2020 are shown as separate entities in FIG. 20, this partition is merely exemplary and persons of ordinary skill will understand that some or all of the functionality of client 2020 may be included in application 2010.

Client 2020 also communicates with store and forward server 2040 over interface 2030. In some embodiments, interface 2030 to server 2040 provides a common framework and single point of contact for biometric submissions and requested information from clients such as client 2020. In some embodiments, interface 2030 may be a web services interface designed to support interoperable machine-to-machine interaction, and/or described in a machine-processable format such as Web Services Description Language (WSDL). In some embodiments, client 2020 communicates with web services interface 2030 in a prescribed manner according to a Simple Object Access Protocol (SOAP). In some embodiments, client 2020 and server 2040 may communicate via eXtensible Markup Language (XML) over Hypertext Transport Protocol (HTTP) and other commonly-used, lower-layer Internet protocols. In such embodiments, client 2020 may receive the search and enrollment requests from application 2010 (including, e.g., fingerprints, facial images, etc.) and convert them into a standard XML format for communication to server 2040 over web services interface 2030. In some embodiments, interface 2030 is a Representational State Transfer (RESTful) interface that allows clients, such as client 2020, to asynchronously submit biometric enrollments and synchronously query for submission updates.

In addition, server 2040 communicates with one or more biometric databases, such as databases 2070, 2072, and 2074, over respective interfaces 2060, 2062, and 2064. Each of the interfaces 2060, 2062, 2064 may be unique or proprietary to the particular database. In some embodiments, one or more of interfaces 2060, 2062, 2064 may be a web services interface, as described above. In some embodiments, one or more of interfaces 2060, 2062, 2064 may provide a secure tunnel between server 2040 and the particular database(s). In any event, server 2040 is capable of translating the XML based submissions received from client 2020 to be compatible with protocols specific to each of interfaces 2060, 2062, 2064, and translating results received into XML format for communication to client 2020. In some embodiments, server 2040 may utilize data modeling, data translation, and similar heuristics to map the XML format received from client 2020 to multiple standards, variations, versions, and formats including, for example, National Institute of Standards and Technology (NIST), FBI, Department of Defense (DoD), Department of Homeland Security (DHS), etc. As these standards change and new standards emerge, server 2040 may be adapted to support such changes and additions.

Exemplary advantages of this web services architecture include a drastically reduced attack space, allowing for a clearly defined perimeter. Consequently, collection devices only need to support the unified security and authentication mechanisms necessary to connect with server 2040 via interface 2030 rather than a disparate security requirements of a variety of databases. In such embodiments, collection devices are able to send the collected data to one destination—server 2040—rather than multiple destinations, thereby reducing bandwidth and power consumption requirements that may be particularly critical for certain collection devices or missions.

In some embodiments, the "store-and-forward" capability of server 2040 allows biometric collections by devices to be "fire-and-forget," so that a user (e.g., agent) may perform multiple biometric captures, submit the records, and continue their duties. Once server 2040 receives results of a particular query, e.g., to database 2070, it will provide the results to the client 2020, so that the submitting agent is only interrupted from ongoing tasks when he or she receives an actionable response. If server 2040 submits a query to and receives results from multiple databases, e.g., databases 2070, 2072, 2074, server 2040 will combine or aggregate these various results into a single response that is provided to client 2020. In some embodiments, this is performed with assistance of match federator 2080 shown in FIG. 20. In some embodiments, database 2050 may include one or more rules or policies with respect to at least a portion of the clients, at least a portion of databases 2070, 2072, 2074, at least a portion of interfaces 2030 and/or 2060, 2062, 2064, and/or match federator 2080. Database 2050 may be accessible by server 2040 via one or more interfaces known to persons of ordinary skill.

Figure 21:
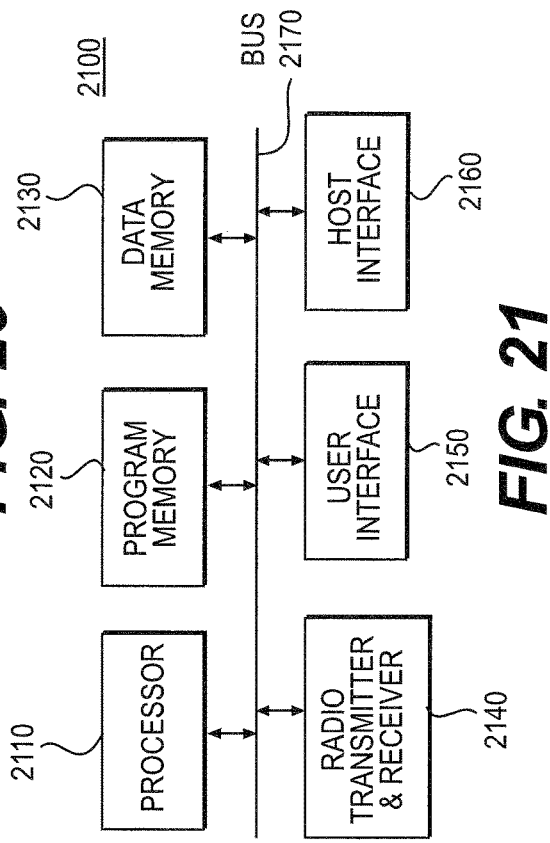
FIG. 21 is a block diagram of an exemplary user interface device, according to one or more embodiments of the present disclosure.

FIG. 21 is a block diagram of exemplary user interface display device or apparatus utilizing certain embodiments of the present disclosure, including execution of the application program that causes display of one or more of the exemplary screen displays shown in FIGS. 1 through 19 and/or execution of a client program for communication with a server such as server 2040 described above with reference to FIG. 20. Device 2100 comprises processor 2110 that is operably connected to program memory 2120 and data memory 2130 via bus 2170 that may comprise parallel address and data buses, serial ports, or other methods and/or structures known to those of ordinary skill in the art. Program memory 2120 comprises software code executed by processor 2110 that enables device 2100 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1×RTT, CDMA2000, 802.11, WiFi, HDMI, USB, Firewire, etc., or any other protocols utilized in conjunction with radio transceiver 2140, user interface 2150, and/or host interface 2160. Program memory 2120 further comprises software code executed by processor 2110 to control the functions of device 2100, including configuring and controlling various components such as radio transceiver 2140, user interface 2150, and/or host interface 2160. Program memory 2120 may also comprise an application program that causes display of one or more of the exemplary screen displays shown in FIGS. 1 through 19 and/or a client that communicates with a server such as server 2040. Such software code may be specified or written using any known or future developed programming language, such as e.g. Java, C++, C, Objective C, HTML, XHTML, and Assembler, as long as the desired functionality, e.g., as defined by the implemented method steps, is preserved.

Data memory 2130 may comprise memory area for processor 2110 to store variables used in protocols, configuration, control, and other functions of device 2100, including the display of one or more of the exemplary screen displays shown in FIGS. 1 through 19, and/or communication with a server such as server 2040. As such, program memory 2120 and data memory 2130 may comprise non-volatile memory (e.g., flash memory), volatile memory (e.g., static or dynamic RAM), or a combination thereof. Furthermore, data memory 2130 may comprise a memory slot by which removable memory cards in one or more formats (e.g., SD Card, Memory Stick, Compact Flash) may be inserted and removed. Persons of ordinary skill in the art will recognize that processor 2110 may comprise multiple individual processors (e.g., multi-core processors), each of which implements a portion of the functionality described above. In such case, multiple individual processors may be commonly connected to program memory 2120 and data memory 2130 or individually connected to multiple individual program memories and or data memories. More generally, persons of ordinary skill in the art will recognize that various protocols and other functions of device 2100 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 2140 may comprise radio-frequency transmitter and/or receiver functionality that enables device 2100 to communicate with other equipment supporting like wireless communication standards. In an exemplary embodiment, radio transceiver 2140 includes an LTE transmitter and receiver that enable device 2100 to communicate with various Long Term Evolution (LTE) networks (also known as "4G") according to standards promulgated by 3GPP. In some embodiments, radio transceiver 2140 includes circuitry, firmware, etc. necessary for device 2100 to communicate with various UMTS and/or GSM/EDGE networks, also according to 3GPP standards. In some embodiments, radio transceiver 2140 includes circuitry, firmware, etc. necessary for device 2100 to communicate with various CDMA2000 networks, according to 3GPP2 standards. In some embodiments, radio transceiver 2140 is capable of communicating using radio technologies that operate in unlicensed frequency bands, such as IEEE 802.11 WiFi that operates using frequencies in the regions of 2.4 and/or 5.6 GHz. In some embodiments, radio transceiver 2140 may comprise a transceiver that is capable of wired communication, such as by using IEEE 802.3 Ethernet technology. In some embodiments, device 2100 may utilize transceiver 2140 to communicate with a server (e.g., server 2040 described above) via an intermediary wired or wireless network, as the case may be. The functionality particular to each of these embodiments may be coupled with or controlled by other circuitry in device 2100, such as processor 2110 executing protocol program code stored in program memory 2120.

User interface 2150 may take various forms depending on the particular embodiment of device 2100. In some embodiments, device 2100 may be a mobile phone, such as an iPhone® sold by Apple, Inc., a device utilizing the Android™ operating system licensed by Google Inc., a device utilizing the Windows® Mobile operating system licensed by Microsoft Corp., or other mobile devices with similar capabilities. In any event, the mobile phone user interface 2150 may comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In such mobile phone embodiments, the particular features comprising the device may depend on whether the device is a smartphone, feature phone, or other type of mobile phone.

In other embodiments, device 2100 may be a tablet computing device (such as an iPad® sold by Apple, Inc.) comprising a touchscreen display that is much larger than touchscreen displays found on mobile phones. In such tablet embodiments, one or more of the mechanical features of user interface 2150 may be replaced by comparable or functionally equivalent virtual user interface features (e.g., virtual keypad, virtual buttons, etc.) implemented using the touchscreen display of device 2100, as familiar to persons of ordinary skill in the art. In other embodiments, device 2100 may be a digital computing device, such as a laptop computer, desktop computer, workstation, etc. that comprises a mechanical keyboard that may be integrated, detached, or detachable depending on the particular embodiment. Such a digital computing device may also comprise a touch screen display. All embodiments of device 2100 having a touch screen display are capable of receiving the user inputs for selection and manipulation of content, as described above with reference to FIGS. 1 through 19.

In some embodiments, device 2100 may comprise an orientation sensor, which can be used to sense when the user has changed the physical orientation of the device 2100's touch screen display. An indication signal from the orientation sensor may be available to any application program executing on device 2100, such that an application program may change the orientation of a screen display (e.g., from portrait to landscape) automatically when the indication signal shows a 90-degree change in physical orientation of the device. In this manner, the application program can maintain the screen display in a manner that is readable by the user, regardless of the physical orientation of the device.

Host interface 2160 of device 2100 also may take various forms depending on the particular embodiment of device 2100. In embodiments where device 2100 is a mobile phone, host interface 2160 may comprise one or more of any of the following interfaces: RS-232, RS-485, USB, HDMI, Bluetooth, IEEE 1394 ("Firewire"), $I^2C$, IEEE 802.3 ("Ethernet"), PCMCIA. Other interfaces known to persons of ordinary skill may be employed for host interface 2160 within the scope of the present disclosure. In some embodiments, host interface 2160 may be used to connect one or more biometric sensors (e.g., fingerprint sensor) to device 2100.

In some embodiments, device 2100 may comprise more functionality than is shown in FIG. 21. In some embodiments, device 2100 may also comprise functionality such as a video and/or still-image camera, microphone, media player, etc., any of which may be used to capture and/or process media items used in conjunction with collaboration threads, as described above with reference to FIGS. 1 through 19. Moreover, radio transceiver 2140 may include circuitry necessary to communicate using additional radio-frequency communication standards including Bluetooth, GPS, and/or others. Persons of ordinary skill in the art will recognize the above list of features and radio-frequency communication standards is merely exemplary and not limiting to the scope of the present disclosure. Accordingly, processor 2110 may execute software code stored in program memory 2120 to control such additional functionality.

Figure 22:
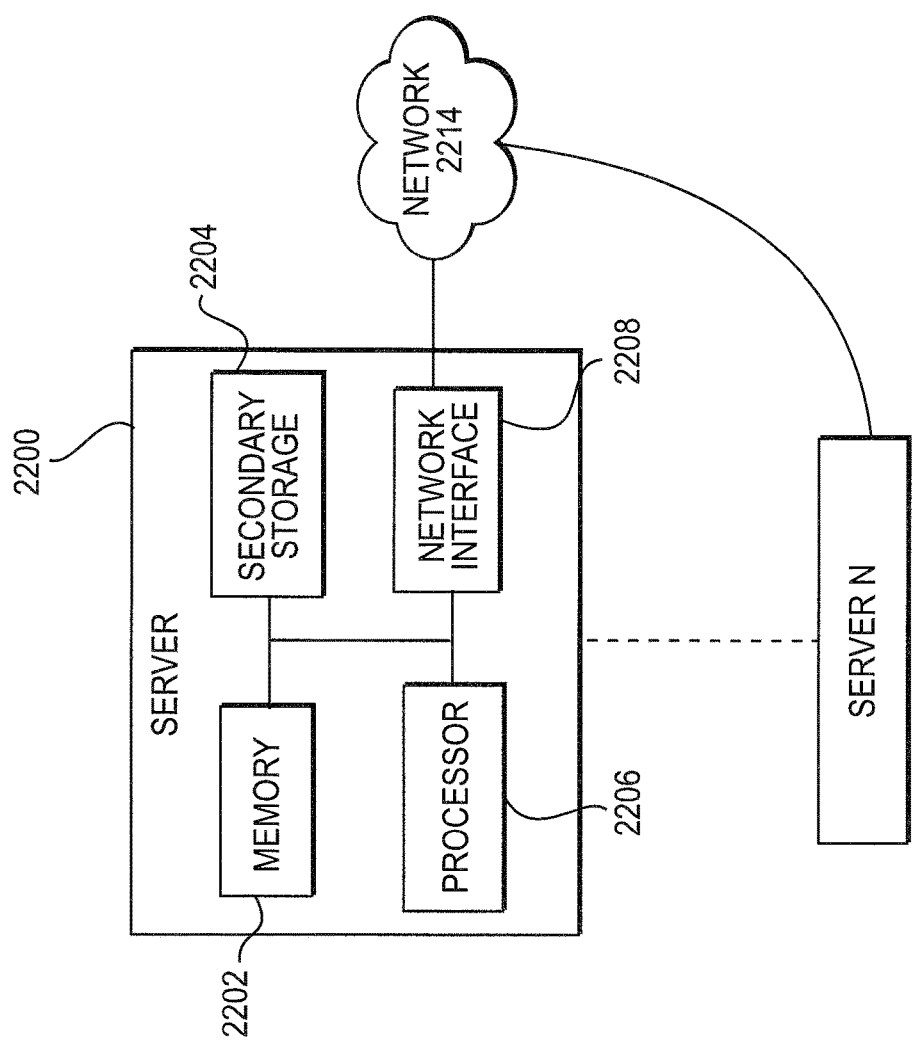
FIG. 22 is a block diagram of an exemplary server, according to one or more embodiments of the present disclosure.

FIG. 22 is a block diagram of an exemplary server that may be utilized in conjunction with certain embodiments of the present disclosure, including communication with a user interface device (e.g., device 2100 shown in FIG. 21) that displays one or more of exemplary screen displays shown in FIGS. 1 through 19. Server 2200 typically includes a memory 2202, a secondary storage 2204, a processor 2206 and a network interface 2208. Memory 2202 may include RAM or similar types of memory, and it may store one or more applications (e.g., database applications, communication applications, security applications, etc.) for execution by processor 2206. Secondary storage 2204 may include a hard disk drive, floppy disk drive, CD-ROM drive, or other types of non-volatile data storage. Processor 2206 executes the application(s), which is stored in memory 2202 or secondary storage 2204, or received from the Internet or other network 2214.

Server 2200 may store a database structure in secondary storage 2204, for example, for storing and maintaining information needed or used by the application(s). Also, processor 2206 may execute one or more software applications in order to provide the functions described in this specification, specifically in the methods described above, and the processing may be implemented in software, such as software modules, for execution by computers or other machines. The processing may provide and support web pages and other GUIs. The GUIs may be formatted, for example, as web pages in HyperText Markup Language (HTML), Extensible Markup Language (XML) or in any other suitable form for presentation on a display device.

Network interface 2208 may comprise transmitters, receivers, and other circuitry that enables server 2200 to communicate with other equipment in a packet and/or circuit-switched network for purposes of normal operation, as well as for administration and maintenance of server 2200 or other network equipment operably connected thereto. In some embodiments, network interface 2208 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

Although server 2200 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, redundant array of independent disks (RAID), floppy disks, or CD-ROM; a carrier wave from the Internet or other network; or other forms of RAM or ROM. The computer-readable media may include instructions for controlling a computer system, such as server 2200, to perform a particular method.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

The invention claimed is:

1. A user interface device comprising:
a display;
at least one processor;
a radio transceiver;
a user interface;
a host interface; and
at least one memory including program code that, when executed by the at least one processor, causes the user interface device to:
    display a menu comprising one or more user-selectable options for initiating capture of biometric information for a subject;
    in response to a user selection, capture one or more biometric identifiers corresponding to the biometric information using a biometric sensor coupled to the user interface device;
    compare the captured biometric identifiers to one or more local biometric templates, wherein the local biometric templates are stored in the at least one memory; and
    if comparison result indicates no matches between the captured biometric identifiers and the one or more local biometric templates, transmit to a biometric intermediary server the captured biometric identifiers and identification of at least one remote repository to receive the captured biometric identifiers, wherein
    the at least one memory controls the radio transceiver, the user interface, and the host interface:
    the radio transceiver comprises radio-frequency transmitter and/or receiver functionality that enables the user interface device to communicate with other equipment supporting compatible wireless communication standards with the user interface device and/or a store and forward server: and
    the host interface is connected to the biometric sensor.

2. The user interface device of claim 1, wherein the at least one memory further comprises additional program code that, when executed by the processor, causes the user interface device to display an indication of verification of the subject's identity if the comparison indicates a match between the captured biometric identifiers and the one or more local biometric templates.

3. The user interface device of claim 1, wherein the at least one memory further comprises additional program code that, when executed by the processor, causes the user interface device to display an indication that the captured biometric identifiers comprise one or more duplicate biometric identifiers if the comparison indicates a match between the captured biometric identifiers and the one or more local biometric templates.

4. The user interface device of claim 1, wherein the at least one memory further comprises additional program code that, when executed by the processor, causes the user interface device to receive a user input selecting at least a portion of the one or more local biometric templates.

5. The user interface device of claim 1, wherein the biometric sensor comprises a fingerprint sensor and the captured biometric identifiers comprise fingerprints.

6. The user interface device of claim 1, wherein the at least one memory further comprises additional program code that, when executed by the at least one processor, causes the user interface device to receive from the biometric intermediary server results of comparing the captured biometric information to one or more remote templates stored in the at least one remote repository.

7. The user interface device of claim 1, wherein:
the comparison result includes a qualitative indicator and a quantitative metric; and
the qualitative indicator indicates a match if the quantitative metric is equal to or above a threshold value.

8. A user interface device comprising:
a display;
at least one processor;
a radio transceiver;
a user interface;
a host interface; and
at least one memory including program code that, when executed by the at least one processor, causes the user interface device to:
display a menu comprising one or more user-selectable options for initiating capture of biometric information for a subject;
in response to a user selection, capture one or more biometric identifiers corresponding to the biometric information using a biometric sensor coupled to the user interface device;
determine one or more metrics related to the quality of the captured biometric identifiers; and
if the one or more metrics indicate that the quality of the captured biometric identifiers is equal to or above a threshold value, transmit to a biometric intermediary server the captured biometric identifiers and identification of at least one remote repository to receive the captured biometric identifiers, wherein
the at least one memory controls the radio transceiver, the user interface, and the host interface;
the radio transceiver comprises radio-frequency transmitter and/or receiver functionality that enables the user interface device to communicate with other equipment supporting compatible wireless communication standards with the user interface device and/or a store and forward server; and the host interface is connected to the biometric sensor.

9. The user interface device of claim 8, wherein the at least one memory further comprises additional program code that, when executed by the processor, causes the user interface device to display a message prompting the user to store at least a portion of the captured biometric identifiers if the one or more metrics indicate that the quality of the captured biometric identifiers is below a threshold value.

10. The user interface device of claim 8, wherein the at least one memory further comprises additional program code that, when executed by the processor, causes the user interface device to display a message prompting the user to initiate capture of at least a portion of the one or more biometric identifiers if the one or more metrics indicate that the quality of the captured biometric identifiers is below a threshold value.

11. The user interface device of claim 8, wherein:
the at least one memory further comprises additional program code that, when executed by the processor, causes the user interface device to initiate comparison of the captured biometric identifiers to one or more local biometric templates if the one or more metrics indicate that the quality of the captured biometric identifiers is equal to or above a threshold value; and
the local biometric templates are stored in the at least one memory.

12. The user interface device of claim 8, wherein the biometric sensor comprises a fingerprint sensor and the captured biometric identifiers comprise fingerprints.

13. The user interface device of claim 8, wherein the at least one memory further comprises additional program code that, when executed by the at least one processor, causes the user interface device to receive from the biometric intermediary server results of comparing the captured biometric information to one or more remote templates stored in the at least one remote repository.

14. A method for biometric information processing in a user interface device, comprising:
displaying a menu comprising one or more user-selectable options for initiating capture of biometric information for a subject;
in response to a user selection, capturing one or more biometric identifiers corresponding to the biometric information using a biometric sensor coupled to the user interface device;
comparing the captured biometric identifiers to one or more local biometric templates, wherein the local biometric templates are stored in at least one memory coupled to the user interface device;
controlling a radio transceiver, a user interface, and a host interface by at least one memory;
connecting the host interface to the biometric sensor: and
if the comparing result indicates no matches between the captured biometric identifiers and the one or local more biometric templates, transmitting to a biometric intermediary server the captured biometric identifiers and identification of at least one remote repository to receive the captured biometric identifiers.

15. The method of claim 14, further comprising displaying an indication of verification of the subject's identity if the comparing indicates a match between the captured biometric identifiers and the one or more local biometric templates.

16. The method of claim 14, further comprising displaying an indication that the captured biometric identifiers comprise one or more duplicate biometric identifiers if the comparing indicates a match between the captured biometric identifiers and the one or more local biometric templates.

17. The method of claim 14, further comprising receiving a user input selecting at least a portion of the one or more local biometric templates.

18. The method of claim 14, wherein the biometric sensor comprises a fingerprint sensor and the captured biometric identifiers comprise fingerprints.

19. The method of claim 14, receiving from the biometric intermediary server results of comparing the captured biometric information to one or more remote templates stored in the at least one remote repository.

20. A method for biometric information processing in a user interface device, comprising:
displaying a menu comprising one or more user-selectable options for initiating capture of biometric information for a subject;
in response to a user selection, capturing one or more biometric identifiers corresponding to the biometric information using a biometric sensor coupled to the user interface device;
determining one or more metrics related to the quality of the captured biometric identifiers;
controlling a radio transceiver, a user interface, and a host interface by at least one memory:
connecting the host interface to the biometric sensor; and
if the one or more metrics indicate that the quality of the captured biometric identifiers is equal to or above a threshold value, transmitting to a biometric intermediary server the captured biometric identifiers and identification of at least one remote repository to receive the captured biometric identifiers.

21. The method of claim 20, further comprising displaying a message prompting the user to store at least a portion of the captured biometric identifiers if the one or more metrics indicate that the quality of the captured biometric identifiers is below a threshold value.

22. The method of claim 20, further comprising displaying a message prompting the user to initiate capture of at least a portion of the one or more biometric identifiers if the one or more metrics indicate that the quality of the captured biometric identifiers is below a threshold value.

23. The method of claim 20, further comprising initiating comparison of the captured biometric identifiers to one or more local biometric templates if the one or more metrics indicate that the quality of the captured biometric identifiers is equal to or above a threshold value, wherein the local biometric templates are stored in at least one memory coupled to the user interface device.

24. The method of claim 20, further comprising receiving from the biometric intermediary server results of comparing the captured biometric information to one or more remote templates stored in the at least one remote repository.

25. A non-transitory, computer-readable medium comprising a set of instructions that, when executed by an apparatus comprising at least one processor, cause the apparatus to:
   display a menu comprising one or more user-selectable options for initiating capture of biometric information for a subject;
   in response to a user selection, capture one or more biometric identifiers corresponding to the biometric information using a biometric sensor coupled to the apparatus;
   connect the biometric sensor to a host interface:
   control the host interface, a radio transceiver, and a user interface:
   compare the captured biometric identifiers to one or more local biometric templates, wherein the local biometric templates are stored in at least one memory coupled to the apparatus; and
   if the comparison result indicates no matches between the captured biometric identifiers and the one or more local biometric templates, transmit to a biometric intermediary server the captured biometric identifiers and identification of at least one remote repository to receive the captured biometric identifiers.

26. The non-transitory, computer-readable medium of claim 25, further comprising instructions that, when executed by the at least one processor, cause the apparatus to display an indication of verification of the subject's identity if the comparison indicates a match between the captured biometric identifiers and the local one or more biometric templates.

27. The non-transitory, computer-readable medium of claim 25, further comprising instructions that, when executed by the at least one processor, cause the apparatus to display an indication that the captured biometric identifiers comprise one or more duplicate biometric identifiers if the comparison indicates a match between the captured biometric identifiers and the one or more local biometric templates.

28. The non-transitory, computer-readable medium of claim 25, further comprising instructions that, when executed by the at least one processor, cause the apparatus to receive a user input selecting at least a portion of the one or more local biometric templates.

29. The non-transitory, computer-readable medium of claim 25, wherein the biometric sensor comprises a fingerprint sensor and the captured biometric identifiers comprise fingerprints.

30. The non-transitory, computer-readable medium of claim 25, further comprising instructions that, when executed by the at least one processor, cause the apparatus to receive from the biometric intermediary server results of comparing the captured biometric information to one or more remote templates stored in the at least one remote repository.

31. A non-transitory, computer-readable medium comprising a set of instructions that, when executed by an apparatus comprising at least one processor, cause the apparatus to:
   display a menu comprising one or more user-selectable options for initiating capture of biometric information for a subject;
   in response to a user selection, capture one or more biometric identifiers corresponding to the biometric information using a biometric sensor coupled to the apparatus;
   connect the biometric sensor to a host interface;
   control the host interface, a radio transceiver, and a user interface:
   determine one or more metrics related to the quality of the captured biometric identifiers; and
   if the one or more metrics indicate that the quality of the captured biometric identifiers is equal to or above a threshold value, transmit to a biometric intermediary server the captured biometric identifiers and identification of at least one remote repository to receive the captured biometric identifiers.

32. The non-transitory, computer-readable medium of claim 31, further comprising instructions that, when executed by the at least one processor, cause the apparatus to display a message prompting the user to store at least a portion of the captured biometric identifiers if the one or more metrics indicate that the quality of the captured biometric identifiers is below a threshold value.

33. The non-transitory, computer-readable medium of claim 31, further comprising instructions that, when executed by the at least one processor, cause the apparatus to display a message prompting the user to initiate capture of at least a portion of the one or more biometric identifiers if the one or more metrics indicate that the quality of the captured biometric identifiers is below a threshold value.

34. The non-transitory, computer-readable medium of claim 31, further comprising instructions that, when executed by the at least one processor, cause the apparatus to initiate comparison of the captured biometric identifiers to one or more local biometric templates if the one or more metrics indicate that the quality of the captured biometric identifiers is equal to or above a threshold value, wherein the local biometric templates are stored in at least one memory coupled to the apparatus.

35. The non-transitory, computer-readable medium of claim 31, further comprising instructions that, when executed by the at least one processor, cause the apparatus to receive from the biometric intermediary server results of comparing the captured biometric information to one or more remote templates stored in the at least one remote repository.

* * * * *